(12) United States Patent
Cui et al.

(10) Patent No.: US 10,870,953 B2
(45) Date of Patent: Dec. 22, 2020

(54) SUSTAINABLY CONSTRUCTED PAVEMENT, AND METHODS AND APPARATUS FOR CONSTRUCTING THE SAME

(71) Applicants: Qingbin Cui, North Potomac, MD (US); Harold Green, Laurel, MD (US); Xiaoyu Liu, Herndon, VA (US); David F Choy, Silver Spring, MD (US)

(72) Inventors: Qingbin Cui, North Potomac, MD (US); Harold Green, Laurel, MD (US); Xiaoyu Liu, Herndon, VA (US); David F Choy, Silver Spring, MD (US)

( * ) Notice: Subject to any disclaimer, the term of this patent is extended or adjusted under 35 U.S.C. 154(b) by 288 days.

(21) Appl. No.: 15/984,046

(22) Filed: May 18, 2018

(65) Prior Publication Data

US 2018/0371709 A1   Dec. 27, 2018

Related U.S. Application Data

(60) Provisional application No. 62/517,525, filed on Jun. 9, 2017.

(51) Int. Cl.
| | |
|---|---|
| G06Q 50/08 | (2012.01) |
| E01C 19/10 | (2006.01) |
| E01C 23/06 | (2006.01) |
| E01C 7/14 | (2006.01) |
| E01C 7/24 | (2006.01) |
| E01C 1/00 | (2006.01) |
| E01C 7/18 | (2006.01) |
| E01C 11/00 | (2006.01) |
| G06Q 10/04 | (2012.01) |

(52) U.S. Cl.
CPC ............ *E01C 19/1004* (2013.01); *E01C 1/00* (2013.01); *E01C 7/142* (2013.01); *E01C 7/182* (2013.01); *E01C 7/24* (2013.01); *E01C 11/005* (2013.01); *E01C 23/065* (2013.01); *G06Q 10/04* (2013.01); *G06Q 50/08* (2013.01)

(58) Field of Classification Search
CPC ... E01C 1/00; E01C 7/24; E01C 7/142; E01C 7/182; E01C 11/005; E01C 19/1004; E01C 23/065; G06Q 10/04; G06Q 50/08
USPC ................. 404/17, 27, 31, 72, 75, 83–93
See application file for complete search history.

(56) References Cited

U.S. PATENT DOCUMENTS

| | | | | |
|---|---|---|---|---|
| 5,766,333 | A  * | 6/1998 | Lukens ................... | C08L 95/00 106/280 |
| 6,599,057 | B2 * | 7/2003 | Thomas .................. | C08L 95/00 404/72 |
| 7,041,165 | B2 * | 5/2006 | Malot .................... | C08L 95/005 106/277 |
| 8,137,024 | B2 * | 3/2012 | Kaul ....................... | E01C 7/085 404/31 |

(Continued)

*Primary Examiner* — Raymond W Addie
(74) *Attorney, Agent, or Firm* — Anova Law Group, PLLC

(57) ABSTRACT

A sustainable pavement is constructed by creating a construction structure for a hot mix asphalt (HMA) pavement according to a pavement project; calculating a greenhouse gas (GHG) emission of the HMA pavement; performing a sustainable construction on the HMA pavement to modify one or more layers in the HMA pavement to form a sustainably constructed pavement; calculating a GHG emission of the sustainably constructed pavement; and obtaining a carbon reduction by comparing the GHG emissions of the HMA pavement and the sustainably constructed pavement.

19 Claims, 4 Drawing Sheets

(56) References Cited

U.S. PATENT DOCUMENTS

| | | | | |
|---|---|---|---|---|
| 8,821,064 B1* | 9/2014 | Morris | ............ | C08L 95/005 |
| | | | | 404/17 |
| 10,053,821 B2* | 8/2018 | Mehta | ............ | C08L 95/00 |
| 2002/0170464 A1* | 11/2002 | Larsen | ............ | E01C 7/18 |
| | | | | 106/273.1 |
| 2005/0018530 A1* | 1/2005 | Romier | ............ | C04B 18/022 |
| | | | | 366/7 |
| 2013/0195551 A1* | 8/2013 | McDade | ............ | C08K 3/34 |
| | | | | 404/75 |
| 2013/0216307 A1* | 8/2013 | Weaver | ............ | E01C 23/065 |
| | | | | 404/75 |
| 2014/0328624 A1* | 11/2014 | Tonder | ............ | C04B 28/04 |
| | | | | 404/44 |

\* cited by examiner

SUSTAINABLY CONSTRUCTED PAVEMENT, AND METHODS AND APPARATUS FOR CONSTRUCTING THE SAME

CROSS-REFERENCES TO RELATED APPLICATIONS

This application claims the priority to U.S. Provisional Patent Application No. 62/517,525, filed on Jun. 9, 2017, the entirety of which is incorporated herein by reference.

TECHNICAL FIELD

The present disclosure generally relates to the field of pavement construction technology, and more particularly, relates to a sustainably constructed pavement, and methods and apparatus for constructing the sustainably constructed pavement.

BACKGROUND

The world overpays, environmentally and monetarily, for traditional hot mix asphalt (HMA) pavement, but continues to use it widely. Environmentally, HMA emits significant amount of greenhouse gas (GHG), sulfur dioxide ($SO_2$), nitrogen oxide (NOx), carbon monoxide (CO), volatile organic compounds (VOC), and volatile hazardous air pollutant (HAP) organic compounds.

While technology exists to curb emissions, unfortunately, government agencies and private businesses are slow to change business as usual for short-term stability and profits.

Accordingly, it is desirable to provide a sustainably constructed pavement, and methods and apparatus for constructing the sustainably constructed pavement to efficiently encourage sustainable pavement design within a desirable budget.

BRIEF SUMMARY

An aspect of the present disclosure provides a method for constructing a sustainable pavement by creating a construction structure for a hot mix asphalt (HMA) pavement according to a pavement project; calculating a greenhouse gas (GHG) emission of the HMA pavement; performing a sustainable construction on the HMA pavement to modify one or more layers in the HMA pavement to form a sustainably constructed pavement; calculating a GHG emission of the sustainably constructed pavement; and obtaining a carbon reduction by comparing the GHG emissions of the HMA pavement and the sustainably constructed pavement.

In some embodiments, performing the sustainable construction on the HMA pavement includes: replacing the one or more layers in the HMA pavement by at least one sustainably constructed layer to form the sustainably constructed pavement. The sustainably constructed layer includes a foamed stabilized base (FSB) layer, a layer of asphalt emulsions, a hot recycling layer, and a hot in-place recycling (HIR) layer. The FSB layer includes at least one of a cold central plant recycling (CCPR) layer, a cold in-place recycling (CIR) layer, or a full depth reclamation (FDR) layer.

In some embodiments, the sustainably constructed pavement includes at least: a base portion and a surface portion over the base portion. The base portion includes at least one sustainably constructed layer, and the surface portion includes at least one HMA layer from the HMA pavement.

In some embodiments, the method further includes: adjusting a construction of the sustainably constructed pavement for a predetermined carbon reduction amount. When the carbon reduction is less than the predetermined carbon reduction amount, the method further includes performing another sustainable construction on the HMA pavement to modify one or more layers in the HMA pavement to form another sustainably constructed pavement; calculating a GHG emission of the another sustainably constructed pavement; and obtaining a carbon reduction by comparing the GHG emissions of the HMA pavement and the another sustainably constructed pavement.

In some embodiments, performing another sustainable construction on the HMA pavement includes: adjusting a thickness of at least one of a plurality of layers in the sustainably constructed pavement; and calculating the GHG emission of the another sustainably constructed pavement and obtaining the carbon reduction include: updating the GHG emission of the another sustainably constructed pavement based on the adjusted thickness, and obtaining a carbon reduction by comparing the GHG emission of the HMA pavement and the updated GHG emissions of the another sustainably constructed pavement.

In some embodiments, the method further includes: calculating a carbon credit payback of the sustainably constructed pavement based on the carbon reduction.

In some embodiments, calculating the GHG emission of the sustainably constructed pavement includes: calculating a production of an emission intensity and a layer size of each layer of the plurality of layers in the sustainably constructed pavement, and calculating a sum of the production of each layer of the plurality of layers in the sustainably constructed pavement as the GHG emission of the sustainably constructed pavement.

In some embodiments, the emission intensity for each layer is determined at least based on a raw material emission factor, a hauling emission factor, a plant energy emission factor, an installation equipment emission factor.

Another aspect of the present disclosure provides a sustainably constructed pavement. The sustainably constructed pavement includes a base portion; and a surface portion over the base portion. The base portion includes one or more sustainably constructed layers selected from a foamed stabilized base (FSB) layer, a layer of asphalt emulsions, a hot recycling layer, and a hot in-place recycling (HIR) layer. The surface portion includes at least one hot mix asphalt (HMA) layer in an HMA pavement having a construction structure according to a pavement project.

In some embodiments, a carbon reduction based on GHG emissions between the HMA pavement and the sustainably constructed pavement is greater than the predetermined carbon reduction amount.

In some embodiments, the FSB layer includes at least one of a cold central plant recycling (CCPR) layer, a cold in-place recycling (CIR) layer, and a full depth reclamation (FDR) layer.

In some embodiments, the sustainably constructed pavement has a construction structure corresponding to the HMA pavement. The one or more sustainably constructed layers replace one or more layers in the HMA pavement for providing the sustainably constructed pavement.

Another aspect of the present disclosure provides an apparatus for constructing a pavement project. The apparatus includes a hardware processor; and a memory storing instructions that, when executed by the hardware processor, cause the hardware processor for: creating a construction structure for a hot mix asphalt (HMA) pavement according to a pavement project; calculating a greenhouse gas (GHG) emission of the HMA pavement; performing a sustainable construction on the HMA pavement to modify one or more layers in the HMA pavement to form a sustainably constructed pavement; calculating a GHG emission of the sustainably constructed pavement; and obtaining a carbon reduction by comparing the GHG emissions of the HMA pavement and the sustainably constructed pavement.

In some embodiments, performing the sustainable construction on the HMA pavement includes: replacing the one or more layers in the HMA pavement by at least one sustainably constructed layer to form the sustainably constructed pavement. The sustainably constructed layer includes a foamed stabilized base (FSB) layer, a layer of asphalt emulsions, a hot recycling layer, and a hot in-place recycling (HIR) layer. The FSB layer includes at least one of a cold central plant recycling (CCPR) layer, a cold in-place recycling (CIR) layer, or a full depth reclamation (FDR) layer.

In some embodiments, the sustainably constructed pavement includes at least: a base portion and a surface portion over the base portion. The base portion includes at least one sustainably constructed layer, and the surface portion includes at least one HMA layer from the HMA pavement.

In some embodiments, the hardware processor is further configured for: instructing a construction of the sustainably constructed pavement for a predetermined carbon reduction amount.

In some embodiments, when the carbon reduction is less than the predetermined carbon reduction amount, the hardware processor is further configured for: performing another sustainable construction on the HMA pavement to modify one or more layers in the HMA pavement to form another sustainably constructed pavement; calculating a GHG emission of the another sustainably constructed pavement; and obtaining a carbon reduction by comparing the GHG emissions of the HMA pavement and the another sustainably constructed pavement.

In some embodiments, performing another sustainable construction on the HMA pavement includes: adjusting a thickness of at least one of a plurality of layers in the sustainably constructed pavement; and calculating the GHG emission of the another sustainably constructed pavement and obtaining the carbon reduction include: updating the GHG emission of the another sustainably constructed pavement based on the adjusted thickness, and obtaining a carbon reduction by comparing the GHG emission of the HMA pavement and the updated GHG emissions of the another sustainably constructed pavement.

In some embodiments, the hardware processor is further configured for: calculating a carbon credit payback of the sustainably constructed pavement based on the carbon reduction.

Another aspect of the present disclosure provides a non-transitory computer-readable medium containing computer-executable instructions that, when executed by a hardware processor, cause the hardware processor to perform the disclosed method for constructing a pavement project.

Other aspects of the present disclosure can be understood by those skilled in the art in light of the description, the claims, and the drawings of the present disclosure.

BRIEF DESCRIPTION OF THE DRAWINGS

Various objects, features, and advantages of the present disclosure can be more fully appreciated with reference to the following detailed description of the present disclosure when considered in connection with the following drawings, in which like reference numerals identify like elements. It should be noted that the following drawings are merely examples for illustrative purposes according to various disclosed embodiments and are not intended to limit the scope of the present disclosure.

DETAILED DESCRIPTION

Figure 1A:
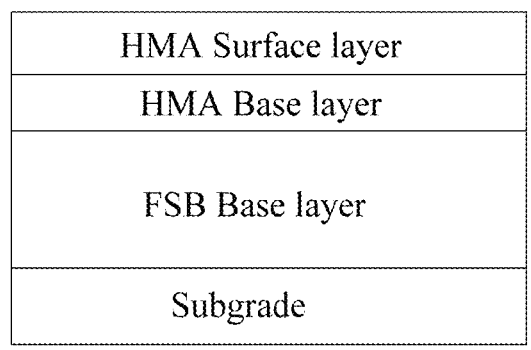
FIGS. 1A-1B illustrate exemplary sustainably constructed pavements in accordance with some embodiments of the present disclosure.

For those skilled in the art to better understand the technical solution of the present disclosure, reference will now be made in detail to exemplary embodiments of the present disclosure, which are illustrated in the accompanying drawings. Wherever possible, the same reference numbers will be used throughout the drawings to refer to the same or like parts.

In accordance with various embodiments of the present disclosure, a sustainably constructed pavement, and methods, apparatus and media for constructing pavement projects, are provided.

The sustainably constructed pavement, and methods and apparatus for constructing the sustainably constructed pavement can enable comparison between a hot mix asphalt (HMA) based pavement and a sustainably constructed pavement (also referred to as "sustainable pavement"), based on performance requirements and economic differences, thus providing the sustainably constructed pavement for roadways, sidewalks, parking lots, etc.

The present disclosure provides an emerging standard for generating carbon credits with sustainable pavement to estimate the saving of $CO_2$ emissions and corresponding carbon credits.

As used herein, the term "reclaimed asphalt pavement (RAP)" refers to a material generated from milling asphalt pavement layers during the rehabilitation of paved surfaces. RAP includes aggregates that are coated by asphalt.

As used herein, the term "hot mix asphalt (HMA)" refers to a mixture of course aggregate, fine aggregate, and asphalt cement that is produced at a central facility at temperatures between about 300° F. and about 325° F.

For example, an HMA can include a large portion of crushed virgin rocks. Fossil fuels are expended to quarry the virgin aggregate and transport the virgin aggregate to a traditional HMA mix plant. The HMA mix plant can process the aggregate to obtain crushed, virgin rocks. The crushed virgin rocks can be mixed with other materials and be heated to a high temperature, e.g., about 163° C. In some cases, the HMA can incorporate a small amount of RAP (e.g., about 10% to about 30%) into the mix. For example, an HMA can include crushed rock (e.g., about 72%), sand (e.g., about 8%), reclaimed asphalt pavement (RAP) (e.g., about 15%), and/or bitumen (e.g., about 5%), by weight.

As used herein, the term "warm mix asphalt (WMA)" refers to a subcategory of HMA and is often defined as HMA that is produced within a target temperature discharge range using appropriate WMA additives or processes. The WMA technologies may be used as coating and compaction aids without lowering the production temperature.

As used herein, the term "foamed stabilized base (FSB)" refers to a mixture of foamed asphalt binder and RAP or a combination of RAP and recycled concrete. Unlike hot mix asphalt (HMA), the foamed asphalt binder does not coat the aggregate particles but just coats the fines (e.g., passing #200 sieve) in the aggregate, which helps serve as a bonding agent to keep the aggregate particles together. In various embodiments, FSB may be used as a base course layer in the pavement construction in lieu of HMA in order to reduce the carbon footprint of construction operation.

In one example, an FSB can include RAP (e.g., about 96%), cement (e.g., about 1%), bitumen (e.g., about 2%), and water (e.g., about 1%), by weight. In a sustainable pavement plant or an FSB plant, the FSB may be produced by replacing the aggregates in an HMA with the RAP, e.g., all RAP. While an HMA plant heats the entire mix to high temperatures, the FSB plant may only heat a small amount of bitumen until it is at a viscous state (e.g., about 155° C.) before mixing this bitumen with the RAP at ambient temperatures. Such lower temperatures require less fuel. That is, use of the large amount RAP (e.g., more than about 70% by weight) emits less GHG and costs less than quarrying, hauling, and processing virgin aggregate.

As used herein, the term "asphalt emulsions" refers to a dispersion of small droplets of one liquid into another liquid. Asphalt emulsions contain small droplets of asphalt binder in water and emulsifying agent. For example, asphalt emulsions may contain asphalt binder (e.g., about 40% to about 75%), emulsifier (e.g., about 0.1% to about 2.5%), and water (e.g., about 25% to about 60%).

As used herein, the term "cold central plant recycling (CCPR)" refers to a method for producing FSB and asphalt emulsions which requires milled RAP to be transported from a current jobsite to a central mixing plant. The unheated RAP is then blended with foamed asphalt and a small amount of Portland cement in a cold mixing process.

As used herein, the term "cold in-place recycling (CIR)" refers to a method for producing FSB and asphalt emulsions which uses one or more mobile recycling machines for milling, asphalt production, and placement in a continuous operation at the pavement site. CIR uses about 100% RAP generated from the current pavement, which is blended with small amount of Portland cement with a treatment depth ranging from about 2 inches to about 6 inches.

As used herein, the term "bitumen" refers to a black or dark colored organic material with adhesive properties derived from distillation of petroleum or natural asphalt. Bitumen is also called liquid asphalt, asphalt binder, and/or liquid asphalt cement.

As used herein, the term "asphalt" refers to a cementitious material, ranging from a dark brown to black color, in which the predominating constituents are bitumen's that occur in nature or are obtained by petroleum processing.

As used herein, the term "asphalt pavement" refers to asphalt concrete layer(s) on supporting courses such as concrete base, asphalt treated base, cement treated base, granular base, and/or granular sub-base placed over the subgrade.

As used herein, the term "foamed asphalt" refers to a mixture of air, water, and bitumen. When injected with a small quantity of cold water, the hot bitumen expands explosively to about fifteen times its original volume and forms a fine mist or foam. In this foamed state, the bitumen has a very large surface area and an extremely low viscosity. This expanded bitumen mist is then incorporated into the mixing drum where the bitumen droplets are attracted to and coat the finer particles of pavement material, thus forming a mastic that effectively binds the mixture together.

As used herein, the term "full depth reclamation (FDR)" refers to a technique in which the full thickness of the asphalt pavement and a pre-determined portion of the underlying material (base, sub-base, and/or subgrade) is uniformly pulverized and blended to provide an upgraded, homogenous base material. FDR is performed on the roadway without the addition of heat, similar to CIR. Thus, the emissions from FDR can be quantified using the same method as CIR.

As used herein, the term "Portland cement" or "Portland cement concrete" refers to the most common type of generally used cement around the world. It is used as a basic ingredient of concrete, mortar, stucco, and most non-specialty grout. It usually originates from limestone. Portland cement is a fine powder that includes more than about 90% ground Portland cement clinker, a limited amount of calcium sulfate (which controls the set time), and up to about 5% minor constituents as allowed by various standards.

As used herein, the term "structural layer coefficient" refers to the relative structural capacity of a material per inch of thickness.

As used herein, the term "virgin aggregate" refers to aggregate that has been quarried and not used in any prior asphalt applications.

As disclosed herein, the pavement construction may include all pavement types including roadways, sidewalks and parking lots (patching projects). Production plants may serve multiple pavement types.

A sustainable construction may include a sustainable mix process, which may include, for example, (a) hot recycling, (b) hot in-place recycling (HIR), (c) cold in-place recycling (CIR), (d) full depth reclamation (FDR), and/or (e) cold central plant recycling (CCPR).

Mix plants performing hot recycling may use batch and drum equipment with a larger percentage of RAP along with recycling agents in comparison to what they would with traditional hot mixes. HIR brings hot recycling to the job site. HIR installers strip and pulverize up to two inches of existing material, combine it with HMA and recycling agents, compact it, and add an HMA surface layer as needed.

CIR is similar to HIR, but it does not heat the reclaimed material. CIR may treat three to four inches of pavement. FDR is another in-place process that generally mixes materials at ambient temperatures. FDR instructs installers to pulverize both existing asphalt and some of any underlying base material (together, usually 4 inches to 12 inches), treat the reclaimed material with additives, add additional aggregate to reach current structural design requirements as needed, compact everything, and apply a surface layer.

CCPR is another cold mix process that can be performed either at a central mix facility or on site with a mobile mix plant. For repair and expansion jobs, transportation of reclaimed material to an offsite plant for processing requires fuel to haul material there and back, but it does not require a mobile plant which may not be available, and it remedies poor drainage problems that may limit CIR. In urban areas, central plants can stockpile RAP from contractors that often have excess amounts of it, then, recycled material or recycled concrete can be transported to new construction jobs.

Table 1 lists methods and applications for HMA and sustainable mix processes.

TABLE 1

| Mix & Application | Mix Temperature* | Mix Location | Example Percentage of Recycled Materials |
|---|---|---|---|
| Hot mix asphalt (HMA) | Hot (163° C.) | Central plant | Low (0-15%) |
| (a) Hot recycling | Hot | Central plant | Medium (15-65%) |
| (b) Hot in-place recycling (HIR) | Hot | In-place | Medium (15-65%) |
| (c) Cold in-place recycling (CIR) | Cold (ambient) | In-place | High (65-98%) |
| (d) Full depth reclamation (FDR) | Cold (ambient) | In-place | High (65-98%) |
| (e) Cold central plant recycling (CCPR) | Cold (ambient) | Central plant- onsite or offsite | High (65-98%) |

For example, FSB can be produced using the CCPR process, the CIR process, and/or the FDR process. As such, an FSB layer may include a CCPR layer, a CIR layer, and/or an FDR layer. In some embodiments, asphalt emulsions can also be produced by the CCPR process, the CIR process, and/or the FDR process.

As an example, an HMA pavement can include an HMA surface layer (e.g., about 2 inches of a layer of HMA mix), an HMA intermediate layer (e.g., about 2.5 inches), an HMA base layer (e.g., about 4 inches), a stabilized drainage layer (e.g., about 2 inches), and a cement treated aggregate (CTA) layer (e.g., about 8 inches), stacked one over another. For example, the HMA surface layer may be formed on the HMA intermediate layer, which may be formed on the HMA base layer. The HMA base layer may be formed on the stabilized drainage layer, which may be formed on the CTA layer.

A sustainable construction of the pavement project can include modification and/or partial replacement of layer(s) in the HMA pavement by the disclosed sustainable mix processes. Sustainably constructed pavement (or sustainable pavement) can thus be formed.

As disclosed herein, a sustainably constructed pavement (or sustainable pavement) may include at least a surface portion and a base portion under the surface portion. The surface portion may include at least one layer of HMA (including WMA), while the base portion may include sustainably constructed layer(s).

A sustainably constructed layer may include, for example, a FSB layer (including CCPR, CIR, and/or FDR), a layer of asphalt emulsions (including CCPR, CIR, and/or FDR), a hot recycling layer, a hot in-place recycling (HIR) layer, etc.

When constructing the sustainable pavement, such sustainably constructed layer(s) may be used to replace one or more layers in an HMA pavement and/or may be additionally inserted in an HMA pavement. The thickness of the sustainably constructed layer(s) such as a FSB layer can be adjusted until the structural number of the sustainable area matches with the original HMA pavement.

In one example, a FSB layer can be a substitute layer for the HMA base layer in the HMA pavement. Exemplary FSB layer can be a FSB-CCPR layer or a FSB-CIR layer, produced by CCPR or CIR, respectively. CCPR uses RAP to replace virgin aggregates. Thus, the emissions associated with quarrying and transporting virgin aggregates can be eliminated. The mix process occurs in ambient temperature, which further reduces the emissions from the use of energy stocks to heat aggregates. CIR has the same production procedure as CCPR except that CIR completes FSB production and placement on the job site. CIR can further reduce GHG emissions due to the elimination of the FSB production plant and associated transportation activities.

In another example, base layer(s) in the HMA pavement can be substituted by Portland cement concrete (PCC) pavement, which includes a surface slab, underlying base and sub-base layers of PCC. PCC can include cement that is very carbon intensive. However, GHG emission of PCC can be lower because PCC has better stiffness and therefore requires thinner layers.

In a certain embodiment, a sustainably constructed pavement may include an HMA surface layer (e.g., about 2 inches) constructed on an HMA intermediate layer (e.g., about 2.5 inches), which is constructed on a FSB-CCPR layer (e.g., about 6 inches). The FSB-CCPR layer is constructed on a stabilized drainage layer (e.g., about 2 inches), which is constructed on a FSB-FDR layer (e.g., about 12 inches).

In another certain embodiment, as shown in FIG. 1A, an exemplary sustainably constructed pavement may include an HMA surface layer and an HMA base layer, constructed on a FSB base layer, which is on a subgrade.

Figure 1B:
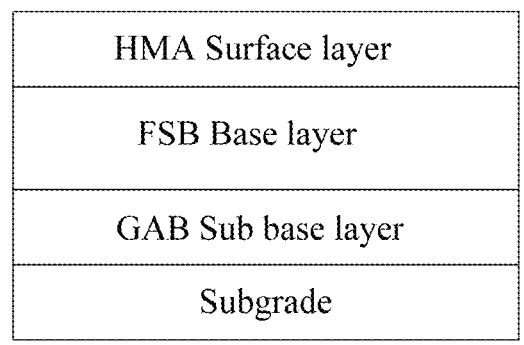

In yet another certain embodiment, as shown in FIG. 1B, an exemplary sustainably constructed pavement may include an HMA surface layer constructed on a FSB base layer, which is on a GAB sub-base layer, on a subgrade.

In various embodiments, the use of the sustainably constructed layer(s), e.g., by cold techniques, can significantly reduce GHG emissions compared to a conservative estimate of GHG emission from the HMA techniques. FSB can be produced with a cold recycling method but offers roughly equivalent structural performance and better environmental benefits.

In some embodiments, a pavement carbon credit estimation tool is disclosed. GHG emission model and carbon credit verification is integrated in the pavement carbon credit estimation tool for constructing pavement projects. The pavement carbon credit estimation tool can mesh seamlessly with the lifecycle assessment (LCA) methodology and the guidance from verified carbon standard (VCS). The pavement carbon credit estimation tool can provide real time and "on-the-fly" carbon footprint measurement, all the way from upstream raw material production through to pavement placement and delivery.

The performance method developed by VCS can be used to verify GHG emission reductions and register for carbon credits. Unlike most existing carbon-reduction verification methodologies that use a project-by-project financial test to additionality, the standardized method dramatically streamlines the processes for verifying additionality and establishing emissions baselines. Using the performance method, GHG emission reductions can be delivered swiftly and affordably across multiple projects, which in turn, lower costs and speed up project approvals.

Based on the performance method, a web-based pavement projects constructing tool is developed to assess the GHG emission reductions resulting from the roads paved by HMA/WMA and the sustainably constructed layer(s) of FSB. The web-based pavement projects constructing tool can calculate the GHG emissions based on user's choice and then compare the GHG emissions of sustainably constructed pavement with respect to the HMA pavement, which is defined as the industrial benchmark, highlighting any emission savings. Based on calculation and optimization results, the tool can generate technical documents that align with VCS carbon credit verification policy, e.g., for sustainably constructed pavements. The documents can assist the users in streamlining future project submission, and thereby facilitate scaling up of emission reductions.

Figure 2:
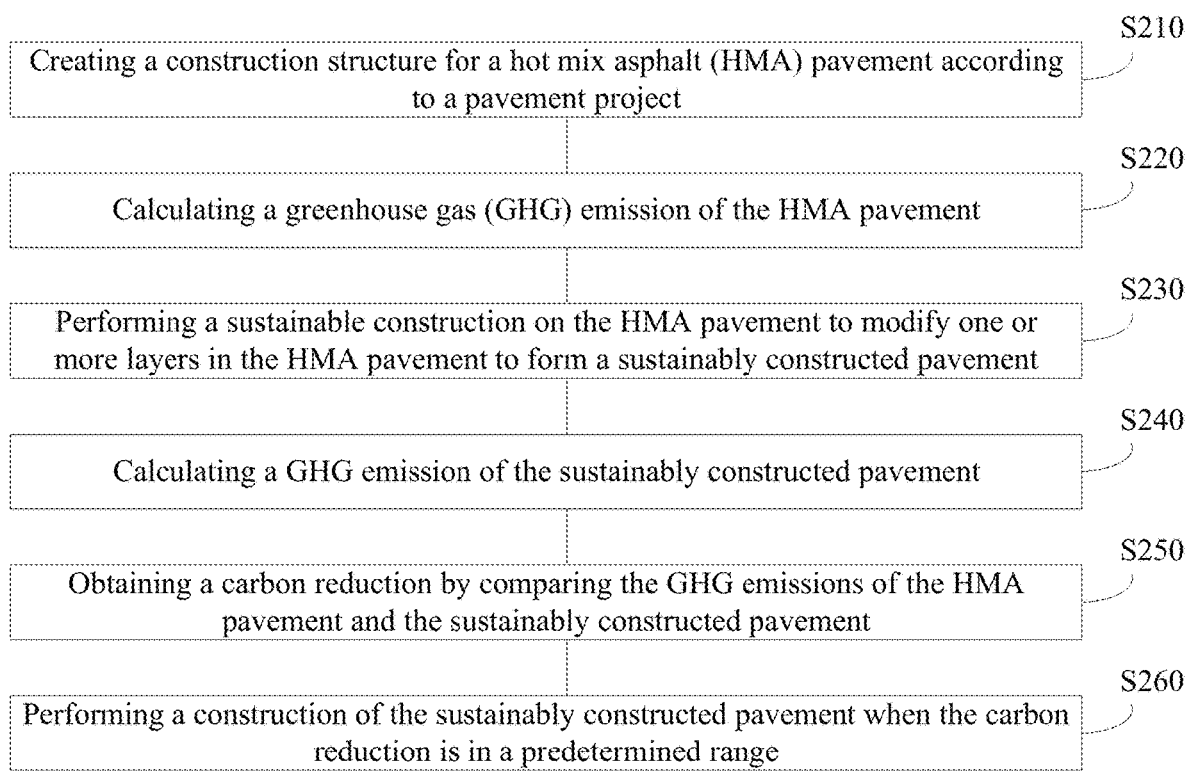
FIG. 2 illustrates a schematic flow diagram illustrating an exemplary process for constructing pavement projects in accordance with some embodiments of the present disclosure.

Referring to FIG. 2, a schematic flow diagram illustrating an exemplary process for constructing pavement projects is shown in accordance with some embodiments of the present disclosure.

At S210, a construction structure of a hot mix asphalt (HMA) pavement may be created according to a pavement project. For example, as a pavement project is initiated, information for constructing the pavement project can be received. In some embodiments, during an initiation of the pavement project, any suitable information of the pavement project, such as a name of the pavement project, a geographic location of the pavement project, climate information, environment information, traffic information, sub-base condition, and other project-specific requirements, can be received, e.g., from a pavement project designer.

The HMA pavement can be created for the pavement project. Information of each layer in the HMA pavement, such as layer material, layer thickness, layer density, layer area, etc., can be received, e.g., from the pavement project designer.

In some embodiments, the layer thicknesses can be determined according to the structural layer coefficient, material property for each pavement layer, and climatic conditions, and traffic loading. The development of damage and distress over the entire lifespan of the pavement can be simulated. If the projected distress is within tolerable limits, the design can be considered adequate. If not, the pavement design is modified, and another iteration/adjustment can be performed to determine its suitability.

At S220, a GHG emission of the HMA pavement of the pavement project can be calculated. In some embodiments, carbon credits can be calculated using the equations from the emerging carbon credit standard for pavement. To calculate the GHG emissions in the HMA pavement, the emerging carbon credit standard can use at least two parameters: amount of mix, and project-to-plant distance.

Two benchmark ratios of $CO_2$ emitted per amount of HMA installed can be derived from typical hot mix and warm mix projects. The emerging carbon credit standard can instruct to choose which of the two benchmark ratios to use based on the distance of the mix plant to the installation job site. For example, a ratio of about 134.5 $kgCO_2$/Mt-HMA can be used for projects within 64 km distance of the mix plant, and a ratio of about 170.0 $kgCO_2$/t-HMA can be used for other projects.

At S230, a sustainable construction can be created for the pavement project to form a sustainably constructed pavement. In the sustainable construction, original layer(s) in the HMA pavement can be modified or replaced by sustainably constructed layer(s) to form the sustainably constructed pavement.

The sustainable construction for forming sustainably constructed pavement can provide an equivalent service over the duration comparing to the HMA pavement. That is, given the same climate, traffic, granular and sub-base properties, and other project-specific requirements, any qualified substitute layer in the sustainable construction can provide an equivalent service when compared with the original layer(s) in the HMA pavement.

In some embodiments, during a creation of the sustainable construction of the pavement project, information of each original layer in the HMA pavement, such as layer material, layer thickness, layer density, layer area, etc., can be received from a pavement project designer.

For example, a density of HMA can be in a range between about 2,435 kg/m³ (about 152 lb/cubic feet) and about 2,563 kg/m³ (160 lb/cubic feet). A density of FSB can be in a range between about 2,002 kg/m³ (125 lb/cubic feet) and about 2,082 kg/m³ (130 lb/cubic feet). The density of Portland cement concrete (PCC) can be about 2,403 kg/m³ (150 lb/cubic feet). The average structural layer coefficients of a 19-mm HMA and FSB are 0.40 and 0.32, respectively. The structural layer coefficient of bitumen for cold mix being used is 0.32.

In various embodiments, an exemplary FSB layer uses only about 1.5-2%, by weight, more material per cubic foot than an HMA layer. This is because the densities are different and FSB's layer coefficient is lower than HMA, thus requiring about 25% more volume while only requiring about 1.5-2% more material to maintain the required specification layer coefficient. The differences between volume and weight may be clarified for calculating emission savings.

At S240, a GHG emission of the sustainably constructed pavement can be calculated. In some embodiments, the calculation of the GHG emission of the sustainable construction of the pavement project may require multiple inputs, constants, database of materials, database of energy sources, and database of pavement equipment. The multiple inputs can be given to calculate emissions associated with at least the following items: raw materials, raw material source to mix plant hauling, plant energy required to create a mix, and/ormix plant to job site hauling, and installation.

In some embodiments, the raw material emissions can include a sum of emissions for each raw material in the mix:

$$e_1 = a \cdot t \cdot \rho_{layer} \cdot \Sigma_i (ef_i \cdot p_i), \qquad (1).$$

In equation (1), a is the layer area, t is the layer thickness, $\rho_{layer}$ is the mix density in amount of mix per unit area, $ef_i$ is the emission factor of material i in amount of $CO_2$ per amount of material, and $p_i$ is the proportion of material i in the mix.

In some embodiments, the raw material source to mix plant hauling emissions can include a sum of the hauling emissions for each raw material. For each raw material, hauling emissions can be a number of trips necessary to transport the material multiplied by the source-to-plant distance multiplied by the truck emission factor. The number of trips can equal to two trips times the weight of the material divided by the track capacity, rounded up to exclude partial trips.

Truck capacity and truck emission factors are constant:

$$e_2 = \sum_i \left(2d_i \cdot \left\lceil \frac{w_i}{c_{truck}} \right\rceil \right) \cdot e_{truck}, \quad (2)$$

In equation (2), $e_{truck}$ is the emission factor of a truck in amount of $CO_2$ per mile traveled (constant), $w_i$ is the weight of material i, $d_i$ is the source to mix plant distance for material i, and $c_{truck}$ is the weight of a truck which may be considered as a constant.

In some embodiments, the plant energy emission released while creating a mix can equal to a ratio of material produced for the layer to the material produced for the plant period, multiplied by a emission produced during the plant period:

$$e_3 = \frac{w}{m} \cdot \sum_i (ef_i \cdot c_i), \quad (3)$$

In Equation (3), w is the weight of the layer calculated from the layer area a, thickness t, and mix density $\rho_{layer}$. The variable m is the weight of the mix produced during a reported plant period, $ef_i$ is the emission factor of the energy source i used at the plant per energy source units (e.g. watts, gallons of fuel), and $c_i$ is the consumption per period of energy source i in energy source units per unit of time.

In the above calculation, the standard can provide a list of emission factors for energy sources, and mix plants are required to provide the amount of mix created and amount of energy expended for a particular period. Such values can be calculated based on operation hours, mix yield, energy bills, and fuel receipts from the plants, etc.

Similar to the raw material hauling emission, the mix plant to job site hauling emission can equal to a distance trucks need to travel times a truck emission factor. The distance that trucks need to travel depends on a number of truck trips, which depends on the layer mix weight and the truck capacity:

$$e_4 = d \cdot n \cdot e_{truck} = d \left(2 \cdot \left\lceil \frac{w_i}{c_{truck}} \right\rceil \right) \cdot e_{truck}, \quad (4)$$

In Equation (4), d is a plant to site distance, n is the number of trips, $e_{truck}$ is the same truck emission factor in amount of $CO_2$ per mile traveled (e.g., a constant) as used in Equation (2), w is the weight of the layer calculated from area a, thickness t, and mix density $\rho_{layer}$ as in Equation (3), and $c_{truck}$ is the same constant weight of a truck used in Equation (2).

The installation equipment emission can be a sum of the emission rates of the installation equipment multiplied by a number of hours that the installation equipment are used:

$$e_5 = \Sigma_i (er_i \cdot t_i), \quad (5).$$

In some embodiments, the standard can provide a list of emission rates for multiple types of equipment including backhoes, cold recyclers, dump trucks, milling machines, pavers/spreaders, different types of rollers, sweepers/scrubbers, tack distributors, and water trucks, etc. In Equation (5), $er_i$ is the emission rate of equipment i in amount of $CO_2$ per unit time, and $t_i$ is the number of service hours for equipment i per unit time. In some embodiments, the unit time can be reported in hours.

Therefore, a total GHG emission released for a sustainable pavement layer can be a sum of the above described emissions in connection with the Equations (1) to (5). In the case of in-place recycling, such as HIR and CIR, the emissions from mix plant to job site hauling can be zero. In the case of CCPR, if a mobile plant is used, a maximum distance across the projects area can be conservatively used, or an average distance that trucks travel at the job site based on a site plan can be accurately calculated.

At S250, the HMA pavement and the sustainably constructed pavement can be compared, e.g., in terms of cost, carbon credits, etc. In some embodiments, the cost of the HMA pavement and the sustainably constructed pavement for the pavement project can be estimated. For example, material costs, labor costs, energy costs, transportation costs, and any other suitable cost of the HMA pavement and the sustainable construction of the pavement project can be calculated based on the market rates. Further, based on the GHG emission calculated on steps 130 and 150 in FIG. 2, corresponding carbon credits can be calculated for the HMA pavement and the sustainable construction of the pavement project, i.e. for the sustainably constructed pavement.

At 170, a carbon reduction and a cost reduction of the sustainable construction can be presented, corresponding to a sustainably constructed pavement, which may include at least a surface portion (e.g., at least one layer of HMA/WMA) and a base portion (e.g., a FSB layer, a layer of asphalt emulsions, a hot recycling layer, a hot in-place recycling (HIR) layer, etc.). In some embodiments, based on the comparison result, a carbon reduction of replacing layer(s) in the HMA pavement by the sustainable construction can be calculated for the pavement project. A carbon credit payback of the pavement project can be further calculated by the estimated based on the carbon reduction.

In some embodiments, e.g., at S260 of FIG. 2, the calculated carbon reduction and a cost reduction of the sustainable construction may be as desired and greater than a predetermined amount.

Accordingly, the sustainably constructed pavement corresponding to desired carbon reduction and a cost reduction can be constructed, e.g., for roadways, sidewalks, and parking lots. For example, the pavement project or the sustainably constructed pavement can be constructed to include an HMA surface layer (e.g., about 2 inches), an HMA intermediate layer (e.g., about 2.5 inches of), a FSB-CCPR layer (e.g., about 6 inches), a stabilized drainage layer (e.g., about 2 inches), and a FSB-FDR layer (e.g., about 12 inches) in order to provide desired carbon reduction and/or cost reduction.

In other embodiments, the calculated carbon reduction and a cost reduction of the sustainable construction may not be as desired and may be out of a predetermined range. In this case, another sustainable construction can be created for the pavement project, according to step 230 of FIG. 2 to form another sustainably constructed pavement having a different construction structure to modify the original layer(s) and/or replace the original layer(s) with different sustainably constructed layer(s). Accordingly, the GHG emission of the another sustainably constructed pavement may be calculated and the carbon reduction may be obtained by comparing the GHG emissions of the HMA pavement and the another sustainably constructed pavement.

In an exemplary sustainably constructed pavement, the base portion may be a FSB layer, which may be thicker than the HMA base in the original HMA pavement. The disclosed thicker, sustainable FSB base layer in the sustainably constructed pavement matches with current process for road pavement. For example, in a road rehabilitation, the current pavement may be milled out, e.g., by an inch deeper, in order to compensate for the use of the thicker base of the sustainably constructed pavement to be processed.

For example, when a project is removing 4 inches of HMA base for replacement with a 5-inch thick sustainable FSB base layer, the road may be milled down further by one inch, to compensate the thick, sustainable FSB base layer. It also depends on how and where the pavement project occurs and the restrictions and specifications on the grade. If the grade is not to be changed the road may be milled deeper. If the grades can be changed, a transition may be made between the current pavement and the sections with a layer of FSB. Each project may specify whether the grades need to match or a transition can be made.

In various embodiments, the service life of FSB and HMA are similar. In an exemplary disclosed sustainably constructed pavement, FSB is used as base a layer with HMA as a surface layer. Under this circumstance the service life is dictated by HMA surface layer performance.

In various embodiments, materials emissions factors may be obtained from Environmental Protection Agency's database Department of Energy's, EIO-LCA (lifecycle assessment) and other databases publicly available. The equipment emission factors may be obtained from EPA tier emission standards, and the assembly emission factors may be obtained from the Inventory of Carbon and Energy developed by University of Bath, UK.

The efforts in reducing GHGs can be financially rewarded under a cap-and-trade scheme relying on caps on the amount of GHG that can be emitted per project/facility. The caps can be translated into tradable emission allowances, which are allocated or auctioned to any facilities and/or projects whose GHG emissions meet or exceed the regulation threshold. Regulated facilities and/or projects that emit less GHGs than their allowance can sell credits to those who emit more. It is noted that, the pavement industry hasn't been allocated a definite cap to date.

It should be noted that the above steps of the flow diagram of FIG. 2 can be executed or performed in any order or sequence not limited to the order and sequence shown and described in the figure. Also, some of the above steps of the flow diagram of FIG. 2 can be executed or performed substantially simultaneously where appropriate or in parallel to reduce latency and processing times. Furthermore, it should be noted that FIG. 1 is provided as an example only. At least some of the steps shown in the figure may be performed in a different order than represented, performed concurrently, or altogether omitted.

Referring to FIG. 3, schematic diagrams illustrating user interfaces of an application for constructing pavement projects are shown in accordance with some embodiments of the present disclosure.

In some embodiments, a web-based software application for implementing the disclosed method described above in connection with FIG. 2 can be provided. The web-based software application for constructing pavement can have a toolkit that including one or more of a pavement GHG credit estimation method, a dataset underlying the performance benchmark, a credit verification document aligned with VCS requirements, and an advanced module that includes pavement design, cost-benefit analysis and project information management.

Figure 3A:
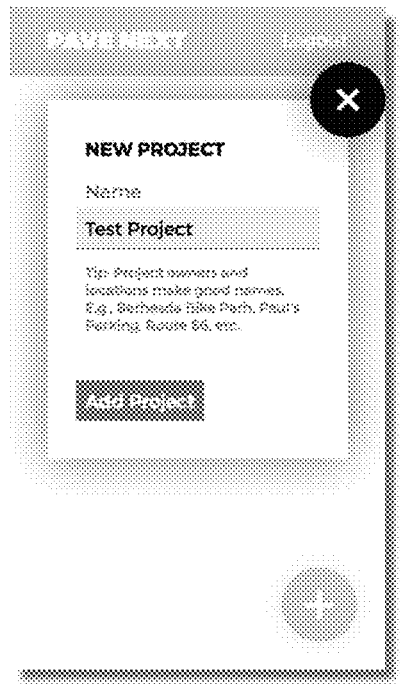
FIG. 3A illustrates an exemplary pavement project.
Figure 3B:
FIG. 3B illustrates design parameters of an exemplary HMA pavement.
Figure 3C:
FIG. 3C illustrates various displayed parameters of an area section of the pavement project.
Figure 3D:
FIG. 3D illustrates an alternative sustainable construction created based on the HMA pavement.
Figure 3E:
FIG. 3E illustrates exemplary generated parameters of the alternative sustainable construction adjusted by a user.
Figure 3F:
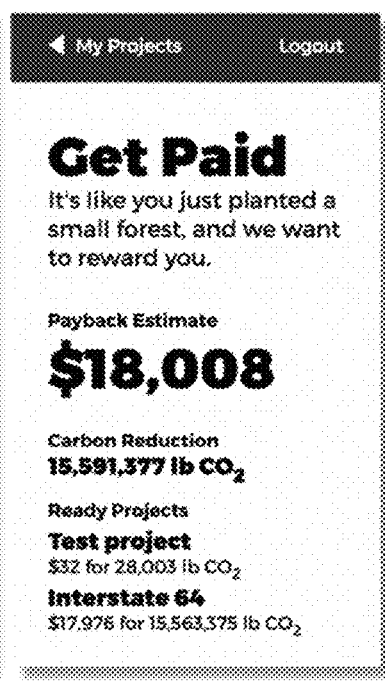
FIG. 3F illustrates a contract summary including carbon reduction information and carbon credit payback information in accordance with some embodiments of the present disclosure.

FIGS. 3A-3F illustrate schematic diagrams illustrating user interfaces of an exemplary application for constructing pavement projects in accordance with some embodiments of the present disclosure. For example, as shown in FIG. 3A, a new pavement project can be created by a user. As shown in FIG. 3B, design parameters of a HMA pavement can be inputted for each layer. As shown in FIG. 3C, various parameters of an area section of the pavement project can be displayed. As shown in FIG. 3D, an alternative sustainable construction can be created based on the HMA pavement. As shown in FIG. 3E, the generated parameters of the alternative sustainable construction can be adjusted by the user. As shown in FIG. 3F, a contract summary including carbon reduction information and carbon credit payback information can be presented.

In some embodiments, the web-based software application can be used by users with various amounts of information and motivation. For example, two or more designs can be inputted into the web-based software application to compare. As another example, based on an existing HMA pavement, a sustainable pavement design can be created to replace the existing HMA pavement. As yet another example, a HMA pavement and one or more sustainable pavement designs can be created for a pavement project, and can be compared with each other to select an optimum design for the pavement project based on the estimated payback. The web-based software application can benefit variety of stakeholders in the following ways.

For asphalt producers, the web-based software application for constructing pavement can provide an assessment of GHG emission impact in the production activities and recommends alternative approaches to reduce emissions. As such, the asphalt producers can benefit from the assistance from carbon finance, increasing the awareness of climate change impacts and improving social recognition through implementing low-carbon technique.

For pavement project contractors, the web-based software application for constructing pavement can assist in selecting pavement materials for proposed projects on the basis of the associated emissions which contribute to climate change. For a certain project, the web-based software application for constructing pavement can compare the emissions from different design options with equivalent structural performance. That is, scientific evidence in the choices of asphalt materials can be provided to address climate change issues.

For pavement project owners, the web-based software application for constructing pavement can allow the pavement project owners to learn possible emission savings and potential monetary benefits through the claims of carbon credits. The information can be an important reference for the pavement project owners when making decisions upon the project requirements, design specifications and the ownership rights of carbon credits.

For consultants in the field of pavement, the web-based software application for constructing pavement can help them to advise project owners/contractors in the choice of asphalt materials. Well-established database for main asphalt products supports comprehensive emission impact analysis for pavements. The web-based software application for constructing pavement can relieve the burdens of sampling from facilities and individual projects and subsequent quantitative analysis.

For academic professionals with research interests in pavement, the web-based software application for constructing pavement can improve the completeness of existing knowledge in pavement carbon footprints and enriches the data pool for quantitative evaluation. The web-based software application for constructing pavement can be used to conduct robustness test for different estimation methods, and to assist in more comprehensive pavement sustainability assessment as a substantial component.

In Table 2 illustrated below, hierarchal object relationships and attributes of the web-based software application.

TABLE 2

| Object | Relationships | Attributes |
| --- | --- | --- |
| User | Child projects | Account and profile information |
| Project | Parent user | Geographic location |
|  | Child designs | Default project mix plant to job site distance |
| Design | Parent project | Default design mix plant to job site distance |
|  | Child area sections | Template |
| Area section | Parent design | Size |
|  | Child layers | Template |
| Layer | Parent area section | Thickness |
|  | Child equipment** | Position |
|  | Child mix | Equipment operating hours |
|  |  | Plant to site distance |
| Mix | Parent Layers | Density (weight/volume) |
|  | Child base Mix*** | Structural layer coefficient |
|  | Child raw materials | Raw material proportions and |
|  | Child energy source | source to plant distances |
|  |  | Energy source consumption amounts |
|  |  | Amount of mix produced per period |
|  |  | Plant energy measurement period |
|  |  | Mix plant to job site distance |
|  |  | Default mix |
| Raw material | Parent mixes | Emission factor (amount of emissions/amount of raw material) |
|  |  | Density (weight/volume) |
| Mix plant energy source | Parent mixes | Consumption units |
|  |  | Emission factor (amount of emissions/consumption units) |
| Installation equipment | Parent layers | Emission factor, Emission rate (amount per hour), |
|  |  | Horsepower, Equipment type, Equipment size, |
|  |  | Manufacturer, Engine maker, Website |

The user object can store account and profile information and may have multiple child projects. Child projects can be exclusive to individual users at the time, and may become nonexclusive in the future with the development of a team object. Note that while Table 1 shows that all other objects can be indirectly related to a user object through parent objects, all other objects can be also directly associated to the user that created such objects.

The project object can have attributes for geographic location and a default project mix plant to job site distance. The purpose of the default project to mix plant job site distance can avoid repeatedly entering values where multiple mixes may come from the same plant. Descendent designs and subsequently mix objects can inherit any default values specified and can override the default values. For example, a default value of 20 miles can be assigned to a project, and a default value of 0 can be assigned to a particular in-place design within the project. In such case, emission calculations for layers not in the project can use the default distance of 20 miles unless overridden. Emission calculations for layers in the in-place design can use a plan to job site distance of 0.

Project objects can have a method to estimate an amount of "cash back" available. The method can check whether a traditional and green design exists, request the carbon emissions for the design objects, and calculate the maximum difference between the designs with the highest and lowest emissions. The amount of carbon saved by a constant that represents the number of dollars a business maybe willing to pay for the carbon reduction credit rights.

While projects are not ready for cash back until a user creates at least one traditional and one green design, the web-based software application can enable users to execute an automatic traditional to sustainable pavement routine, called "greenify design" as shown in FIG. 3D, for projects without a sustainable construction. The algorithm can duplicate a given HMA design, and replaces middle layers of HMA in the HMA design with a single layer of FSB. The thickness of the FSB layer can be adjusted until the structural number of the sustainable area matches that of the traditional design.

Design objects can include default mix plant to job site distances which override any project value and can be overridden by any child mix value. Design objects can be marked as templates, such that the design objects can be copied as new ones. For example, an approved design for a major arterial highway can be used as a design template. Design objects can contain one or more area sections and sum the emissions for individual areas.

Areas section objects can belong exclusively to the parent designs, and also be marked as templates. The areas section objects can be used to calculate volumes and amounts of material. The areas section objects can report total thicknesses, impact, and structural numbers from child layers. Further, the areas section objects can have the child methods used to "greenify design". The methods can combine and replace traditional layers with sustainable layers in the iterative algorithm.

Layers objects can belong exclusively to the parent areas and have one mix. A thickness, a layer position, and a single mix can be assigned to any layer. Layers objects may include the information of mix plants to supply the distances drivers haul raw materials to the plants, the fuel sources they consume, the corresponding production rates, and the type and number of operating hours of installation equipment.

Figure 4:
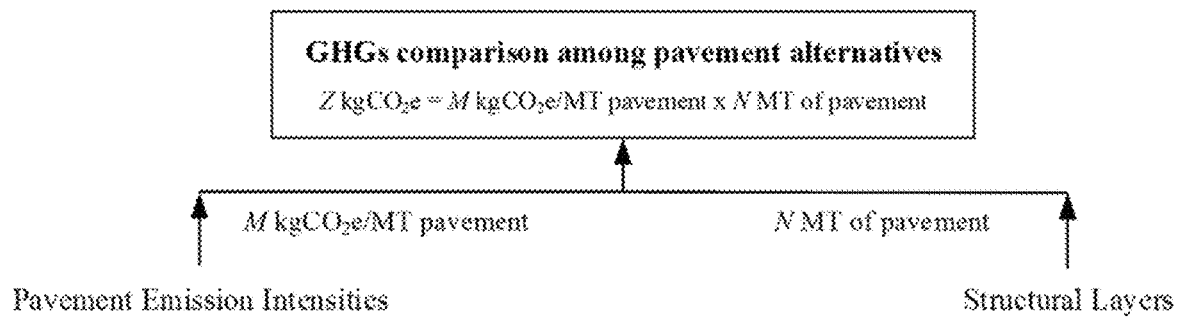
FIG. 4 illustrates a schematic diagram of an exemplary method for comparing greenhouse gas (GHG) emissions among pavement designs is shown in accordance with some embodiments of the present disclosure.

Referring to FIG. 4, a schematic diagram of an exemplary method for comparing GHG emissions among pavement designs is shown in accordance with some embodiments of the present disclosure.

The GHG emissions from the pavement constructed by different pavement designs, such as HMA, FSB, and/or PCC, can be compared with other. Different pavement designs have different material properties, and can be paved with a different layer of thickness. The selection of materials, associated with the designed layers, have a direct impact on pavement GHG emissions. To capture the impact, the material and layer size can be synthesized into project emission calculation, following the logic as shown in FIG. 4.

The GHG emission of the pavement design can be obtained by multiplying the emission intensities and structural layers. Specifically, the magnitude of the GHG emission the pavement design can equal to a product of the pavement emission intensity in the unit of $kgCO_2$ equivalent per metric ton of pavement ($kgCO_2e/MT$) and the quantity of materials used in pavement layers in the unit of MT of pavement.

A pavement lifecycle includes material production, pavement design, construction, use and end-of-life. Lifecycle emissions can be the summation of the GHGs emitted from each of the lifecycle stage. In order to make a comparison, pavements can be designed to have the same serviceability at construction and thus are assumed to have the same maintenance schedule. The differences of lifecycle emissions among pavement designs are therefore the summation of the emissions differences in the stages of material production, pavement design and construction.

The GHG emission of the pavement project can be a summation of the emissions from raw material, transportation, mix production and placement. Raw material emissions can be equal to a sum of productions of the quantity of each material and the corresponding emission factors.

In some embodiments, the emissions from mix production and placement involve the operation of equipment/vehicles. The emissions from mix production and placement can be estimated from the hours of use, the number of pieces on site, and equipment-specific parameters such as the emission factor and the horsepower.

The percentage utilization (PU) can be used to rule out the time for idling and moving. PU can be calculated using the effective operation time divided by the total labor hours. The emission rate of idling equipment can be estimated as about one quarter of the emission rate of operating equipment. Such estimation can be used to create an adjustment index (AI), which equals to PU+0.25(1-PU), as shown in Equation (6) below:

$$E_{Equipment} = \Sigma_i \cdot EF_i \cdot HP_i \cdot HR_i \cdot AI_i, \quad (6).$$

In Equation (6), $AI_i = PU_i + 0.25(1-PU_i)$; i is the equipment type that includes milling machine, backhoe, bobcat/loader, sweeper/broom, excavator, paver, roller, water truck, dump truck, etc.; $EF_i$ is the mission factor for equipment i in the unit of $MTCO_2e$/hp-hr; $HP_i$ is the horsepower of equipment i in the unit of hp; $HR_i$ is labor hours for equipment i; $AI_i$ is the adjustment index of equipment i; and $PU_i$ is the percentage time of utilization of equipment i.

In some embodiments, the publicly available databases can be used to collect emission factors of raw materials, energy and equipment/vehicles. For example, the raw materials emission factors can be obtained from the Inventory of Carbon and Energy and the Economic Input-Output Life Cycle Model. The energy emission factors can be obtained from the Climate Registry database. The equipment emission factors can be derived from the engine certification data. The equipment manufacture can be matched with the engine maker and stratified the equipment by their capacities.

Figure 5:
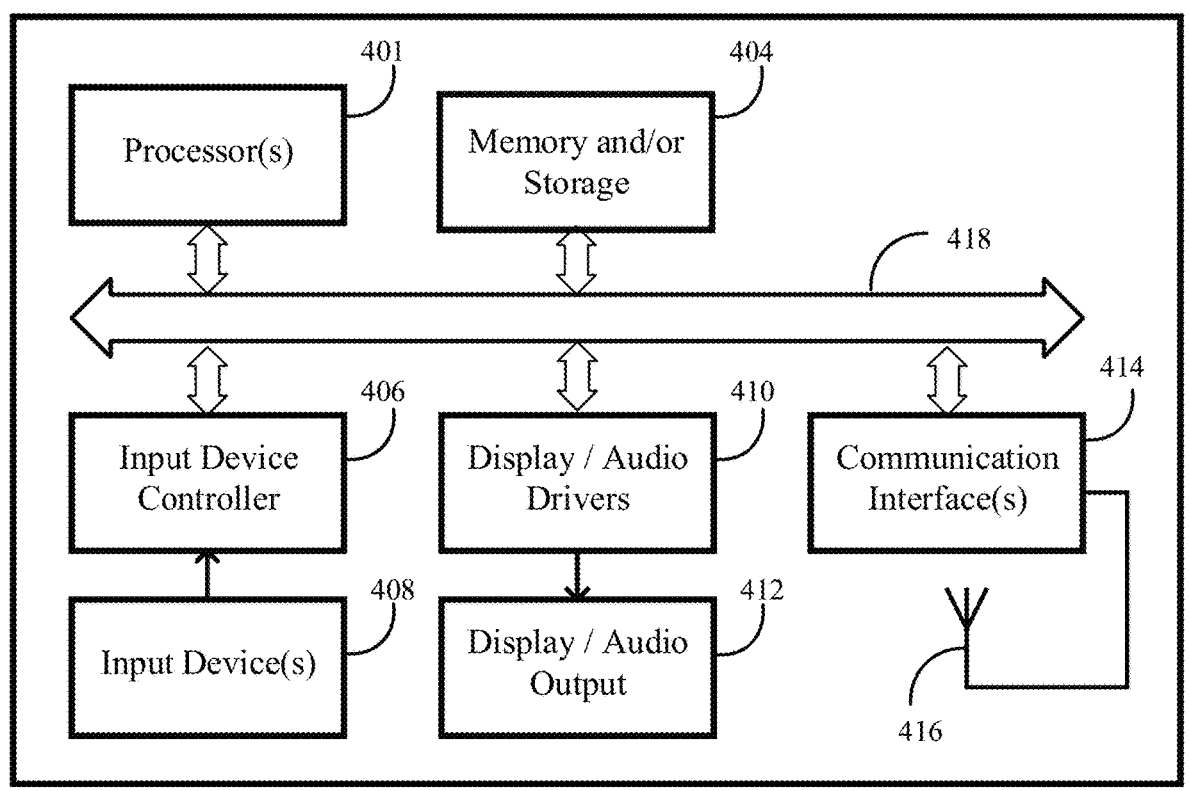
FIG. 5 illustrates a schematic block diagram of exemplary hardware of an apparatus for constructing pavement projects in accordance with some embodiments of the present disclosure.

Referring to FIG. 5, a schematic block diagram of exemplary hardware of an apparatus for constructing pavement projects is shown in accordance with some embodiments of the present disclosure. The apparatus can include a mobile phone, a tablet computer, a laptop computer, a desktop computer, a server, and/or any other suitable device.

As illustrated, the hardware of the apparatus for constructing pavement projects can include at least one hardware processor 401, at least one memory and/or storage 404, at least one input device controller 406, multiple input devices 408, display/audio drivers 410, display and audio output circuitry 412, communication interface(s) 414, one or more antennas 416, a bus 418, and any other suitable components.

The at least one hardware processor 401 can include any suitable hardware processor(s), such as microprocessor, micro-controller, a central process unit, graphics processing unit, digital signal processor, array processor, vector processor, dedicated logic, and/or any other suitable circuitry for controlling the functioning of a general purpose computer or special purpose computer in some embodiments.

In some embodiments, the at least one hardware processor 401 can implement or execute various embodiments of the present disclosure including one or more method, operations and block/logic diagrams. For example, the at least one hardware processor 401 can perform at least some of the processes/operations as described above in connection with FIG. 2.

The processes/operations of the disclosed method in various embodiments can be directly executed by a combination of the at least one hardware processor 401 and one or more software modules. The one or more software modules may reside in any suitable storage/memory medium, such as a random access memory, a flash memory, a read-only memory, a programmable read-only memory, an electrically erasable programmable memory, a register, etc. The storage medium can be located in the at least one memory and/or storage 404. The at least one hardware processor 401 can implement the processes/operations of the disclosed method by combining the hardware and the information read from the at least one memory and/or storage 404.

The at least one memory and/or storage 404 can be any suitable memory and/or storage for storing programs, data, media content, comments, information of users and/or any other suitable content in some embodiments. For example, the at least one memory and/or storage 404 can include random access memory, read only memory, flash memory, hard disk storage, optical media, and/or any other suitable storage device.

The at least one input device controller 406 can be any suitable circuitry for controlling and receiving input from the multiple input devices 408 in some embodiments. For example, input device controller 406 can be circuitry for receiving input from a touch screen, from one or more buttons, from a voice recognition circuit, from a microphone, from a camera, from an optical sensor, from an accelerometer, from a temperature sensor, from a near field sensor, and/or any other suitable circuitry for receiving data input and/or signal input.

The display/audio drivers 410 can be any suitable circuitry for controlling and driving output to one or more display and audio output circuitries 412 in some embodiments. For example, display/audio drivers 410 can be circuitry for driving an LCD display, a speaker, an LED, and/or any other display/audio device.

The communication interface(s) 414 can be any suitable circuitry for interfacing with one or more communication networks. For example, interface(s) 414 can include network interface card circuitry, wireless communication circuitry, and/or any other suitable circuitry for interfacing with one or more communication networks. In some embodiments, communication network can be any suitable combination of one or more wired and/or wireless networks such as the Internet, an intranet, a wide-area network ("WAN"), a local-area network ("LAN"), a wireless network, a digital subscriber line ("DSL") network, a frame relay network, an asynchronous transfer mode ("ATM") network, a virtual private network ("VPN"), a WiFi network, a WiMax network, a satellite network, a mobile phone network, a mobile data network, a cable network, a telephone network, a fiber optic network, and/or any other suitable communication network, or any combination of any of such networks.

The one or more antennas 416 can be any suitable one or more antennas for wirelessly communicating with a communication network in some embodiments.

The bus 418 can be any suitable mechanism for communicating between two or more of components 401, 404, 406, 410, and 414 in some embodiments. The bus 418 can be divided into an address bus, a data bus, a control bus, etc. The bus 418 is represented as a two-way arrow in FIG. 5, but it does not mean that it is only one type bus or only one bus.

Any other suitable components not shown in FIG. 5 can be included in the hardware in accordance with some embodiments. Any unnecessary components shown in FIG. 5 may also be omitted in the hardware in accordance with some other embodiments.

In some embodiments, some portions of the various embodiments of the disclosed method and apparatus, as well as some portions of architectures, functions and operations that can be implemented by computer program products. In this case, some blocks of the flow diagram or the block diagram may represent a module, a code segment, a portion of program code. Each module, each code segment, and each portion of program code can include one or more executable instructions for implementing predetermined logical functions.

It should also be noted that, each block in the block diagram and/or flow diagram, as well as the combinations of the blocks in the block diagrams and/or flow diagram, can be realized by a dedicated hardware-based apparatus for executing specific functions, or can be realized by a dedicated apparatus combined by hardware and computer instructions.

It should also be noted that, in some alternative implementations, the functions illustrated in the blocks be executed or performed in any order or sequence not limited to the order and sequence shown and described in the figures. For example, two consecutive blocks may actually be executed substantially simultaneously where appropriate or in parallel to reduce latency and processing times, or even be executed in a reverse order depending on the functionality involved in.

In some embodiments, any suitable computer readable media can be used for storing instructions for performing the processes described herein. For example, in some embodiments, computer readable media can be transitory or non-transitory. For example, non-transitory computer readable media can include media such as magnetic media (such as hard disks, floppy disks, and/or any other suitable media), optical media (such as compact discs, digital video discs, Blu-ray discs, and/or any other suitable optical media), semiconductor media (such as flash memory, electrically programmable read only memory (EPROM), electrically erasable programmable read only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

The provision of the examples described herein (as well as clauses phrased as "such as," "e.g.," "including," and the like) should not be interpreted as limiting the claimed present disclosure to the specific examples; rather, the examples are intended to illustrate only some of many possible aspects.

Accordingly, methods, apparatus and media for constructing pavement projects are provided. The disclosed method for constructing pavement projects can accelerate the application of carbon finance in pavement projects. Revenues from selling carbon credits on the market can create opportunities for business that are developing green pavement projects. The availability of easily used yet rigorous tools in the present disclosure for quantifying carbon footprints can provide linkages, support or assistance with regards to carbon finance. By creating a commercial value for reducing GHG emissions, the present disclosure can provide an additional source of revenue for a sustainable pavement project. This increases the commercial viability of a green project, and can therefore play an important role in sustaining and growing the green business.

Due to the advantages of performance method, the disclosed method for constructing pavement projects can contribute to lower transaction costs and provide a streamlined way to scale up green project development. The nature of performance method can remove a great deal of subjectivity, providing far more certain outcomes. If widely applied, disclosed method for constructing pavement projects can dramatically lower transaction costs across whole classes of activities and allow for scaling up of emission reductions to a level that could make a meaningful impact on the climate.

A key element to changing behavior on the part of the pavement project designer are better environmental impact measurements. The use of the disclosed method for constructing pavement projects can dramatically change pavement construction best practices. Once validated for each type of pavements, the disclosed method for constructing pavement projects can permit pavement practitioners to evaluate and alter pavement design in order to reduce energy use and GHG emissions over the life cycle of the pavement. Constructors can better evaluate pavement techniques and managers can exploit improved efficiencies to reduce carbon emissions.

Although the present disclosure has been described and illustrated in the foregoing illustrative embodiments, it is understood that the present disclosure has been made only by way of example, and that numerous changes in the details of embodiment of the present disclosure can be made without departing from the spirit and scope of the present disclosure, which is only limited by the claims which follow. Features of the disclosed embodiments can be combined and rearranged in various ways. Without departing from the spirit and scope of the present disclosure, modifications, equivalents, or improvements to the present disclosure are understandable to those skilled in the art and are intended to be encompassed within the scope of the present disclosure.

What is claimed is:

1. A method for constructing a sustainable pavement, comprising:
   creating a construction structure for a hot mix asphalt (HMA) pavement according to a pavement project;
   calculating a greenhouse gas (GHG) emission of the HMA pavement;
   performing a sustainable construction on the HMA pavement to modify one or more layers in the HMA pavement to form a sustainably constructed pavement;
   calculating a GHG emission of the sustainably constructed pavement; and
   obtaining a carbon reduction by comparing the GHG emissions of the HMA pavement and the sustainably constructed pavement.

2. The method of claim 1, further comprising:
   calculating a carbon credit payback of the sustainably constructed pavement based on the carbon reduction.

3. The method of claim 1, wherein performing the sustainable construction on the HMA pavement includes:
   replacing the one or more layers in the HMA pavement by at least one sustainably constructed layer to form the sustainably constructed pavement, wherein:
      the sustainably constructed layer includes a foamed stabilized base (FSB) layer, a layer of asphalt emulsions, a hot recycling layer, and a hot in-place recycling (HIR) layer, and the FSB layer includes at least one of a cold central plant recycling (CCPR) layer, a cold in-place recycling (CIR) layer, or a full depth reclamation (FDR) layer.

4. The method of claim 3, wherein the sustainably constructed pavement includes at least:
a base portion, and
a surface portion over the base portion, wherein:
the base portion includes the at least one sustainably constructed layer, and
the surface portion includes at least one HMA layer from the HMA pavement.

5. The method of claim 1, further comprising:
adjusting a construction of the sustainably constructed pavement for a predetermined carbon reduction amount.

6. The method of claim 5, further comprising, when the carbon reduction is less than the predetermined carbon reduction amount,
performing another sustainable construction on the HMA pavement to modify one or more layers in the HMA pavement to form another sustainably constructed pavement;
calculating a GHG emission of the another sustainably constructed pavement; and
obtaining a carbon reduction by comparing the GHG emissions of the HMA pavement and the another sustainably constructed pavement.

7. The method of claim 6, wherein:
performing another sustainable construction on the HMA pavement includes:
adjusting a thickness of at least one of a plurality of layers in the sustainably constructed pavement; and
calculating the GHG emission of the another sustainably constructed pavement and obtaining the carbon reduction include:
updating the GHG emission of the another sustainably constructed pavement based on the adjusted thickness, and
obtaining a carbon reduction by comparing the GHG emission of the HMA pavement and the updated GHG emissions of the another sustainably constructed pavement.

8. The method of claim 1, wherein calculating the GHG emission of the sustainably constructed pavement includes:
calculating a production of an emission intensity and calculating a layer size of each layer of the plurality of layers in the sustainably constructed pavement, and
calculating a sum of the production of each layer of the plurality of layers in the sustainably constructed pavement as the GHG emission of the sustainably constructed pavement.

9. The method of claim 8, wherein:
the emission intensity for each layer is determined at least based on a raw material emission factor, a hauling emission factor, a plant energy emission factor, an installation equipment emission factor.

10. A sustainably constructed pavement, constructed using the method of claim 1, the sustainably constructed pavement comprising:
another construction structure, based on the construction structure for the HMA pavement that includes: an HMA surface layer, an HMA base layer, a stabilized drainage layer, and a cement treated aggregate, stacked one over another,
wherein the another construction structure of the sustainably constructed pavement includes a sustainably constructed layer selected from a foamed stabilized base (FSB) layer, a layer of asphalt emulsions, a hot recycling layer, a hot in-place recycling (HIR) layer, or a combination thereof, to replace at least one of the HMA base layer, the stabilized drainage layer, and the cement treated aggregate in the construction structure for the HMA pavement.

11. The sustainably constructed pavement of claim 10, wherein:
the FSB layer includes at least one of a cold central plant recycling (CCPR) layer, a cold in-place recycling (CIR) layer, and a full depth reclamation (FDR) layer.

12. The sustainably constructed pavement of claim 10, wherein:
the construction structure for the HMA pavement further includes an HMA intermediate layer stacked between the HMA surface layer and the HMA base layer.

13. An apparatus for constructing a pavement project, comprising:
a hardware processor; and
a memory storing instructions that, when executed by the hardware processor, cause the hardware processor for:
creating a construction structure for a hot mix asphalt (HMA) pavement according to a pavement project;
calculating a greenhouse gas (GHG) emission of the HMA pavement;
performing a sustainable construction on the HMA pavement to modify one or more layers in the HMA pavement to form a sustainably constructed pavement;
calculating a GHG emission of the sustainably constructed pavement; and
obtaining a carbon reduction by comparing the GHG emissions of the HMA pavement and the sustainably constructed pavement.

14. The apparatus of claim 13, wherein the hardware processor is further configured for:
calculating a carbon credit payback of the sustainably constructed pavement based on the carbon reduction.

15. The apparatus of claim 13, wherein performing the sustainable construction on the HMA pavement includes:
replacing the one or more layers in the HMA pavement by at least one sustainably constructed layer to form the sustainably constructed pavement, wherein:
the sustainably constructed layer includes a foamed stabilized base (FSB) layer, a layer of asphalt emulsions, a hot recycling layer, and a hot in-place recycling (HIR) layer, and
the FSB layer includes at least one of a cold central plant recycling (CCPR) layer, a cold in-place recycling (CIR) layer, or a full depth reclamation (FDR) layer.

16. The apparatus of claim 15, wherein the sustainably constructed pavement includes at least:
a base portion, and
a surface portion over the base portion, wherein:
the base portion includes the at least one sustainably constructed layer, and
the surface portion includes at least one HMA layer from the HMA pavement.

17. The apparatus of claim 13, wherein the hardware processor is further configured for:
instructing a construction of the sustainably constructed pavement when the carbon reduction is greater than the predetermined carbon reduction amount.

18. The apparatus of claim 17, wherein, when the carbon reduction is out of the predetermined range, the hardware processor is further configured for:
- performing another sustainable construction on the HMA pavement to modify one or more layers in the HMA pavement to form another sustainably constructed pavement;
- calculating a GHG emission of the another sustainably constructed pavement; and
- obtaining a carbon reduction by comparing the GHG emissions of the HMA pavement and the another sustainably constructed pavement.

19. The apparatus of claim 18, wherein:
performing another sustainable construction on the HMA pavement includes:
- adjusting a thickness of at least one of a plurality of layers in the sustainably constructed pavement; and calculating the GHG emission of the another sustainably constructed pavement and obtaining the carbon reduction include:
- updating the GHG emission of the another sustainably constructed pavement based on the adjusted thickness, and
- obtaining a carbon reduction by comparing the GHG emission of the HMA pavement and the updated GHG emissions of the another sustainably constructed pavement.

\* \* \* \* \*